(12) United States Patent
Takeshita et al.

(10) Patent No.: US 7,168,082 B2
(45) Date of Patent: Jan. 23, 2007

(54) OPTICAL ACTUATOR

(75) Inventors: Nobuo Takeshita, Tokyo (JP); Mitoru Yabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 207 days.

(21) Appl. No.: 10/780,868

(22) Filed: Feb. 19, 2004

(65) Prior Publication Data

US 2004/0177365 A1   Sep. 9, 2004

(30) Foreign Application Priority Data

Feb. 28, 2003   (JP) ............................. 2003-052554

(51) Int. Cl.
*G11B 7/09* (2006.01)
*G11B 7/085* (2006.01)
*G11B 7/08* (2006.01)

(52) U.S. Cl. .................. 720/683; 720/682; 369/44.15; 369/44.22

(58) Field of Classification Search ......... 720/681–687
See application file for complete search history.

(56) References Cited

U.S. PATENT DOCUMENTS

| RE33,548 E | 3/1991 | Kime |
| 5,986,825 A | 11/1999 | Marino et al. |
| 6,144,352 A | 11/2000 | Matsuda et al. |
| 6,342,978 B1 | 1/2002 | Nishikawa et al. |
| 6,643,073 B1 * | 11/2003 | Akeda ........................ 359/696 |
| 6,775,207 B1 * | 8/2004 | Takeshita et al. ........ 369/44.15 |
| 2002/0006090 A1 | 1/2002 | Kawano |
| 2003/0012090 A1 | 1/2003 | Kawano |
| 2004/0070850 A1 * | 4/2004 | Kim et al. .................. 359/811 |

FOREIGN PATENT DOCUMENTS

| JP | 9-16990 A | 1/1997 |
| JP | 9-219031 A | 8/1997 |
| JP | 10116431 A | 5/1998 |
| JP | 10320804 A | 12/1998 |
| JP | 2000-020025 A | 1/2000 |
| JP | 2000-242944 A | 9/2000 |
| JP | 2001-93177 A | 4/2001 |
| JP | 2001118269 A * | 4/2001 |
| JP | 2001-297460 A | 10/2001 |
| JP | 2001-319349 A | 11/2001 |
| JP | 2002092916 A | 3/2002 |

* cited by examiner

*Primary Examiner*—William J Klimowicz
(74) *Attorney, Agent, or Firm*—Birch, Stewart, Kolasch & Birch, LLP (57) ABSTRACT

An optical actuator according to this invention includes a focusing lens for focusing a laser beam on a information disk, a lens holder for holding the focusing lens, a focusing coil for driving the focusing lens in an axial direction of the laser beam, a tracking coil for driving the focusing lens in a radial direction of the information disk, a tilting coil for pivotally rotating the focusing lens on an axis along the tangential direction of the disk and a pair of supporting members each disposed on each opposing sides of the lens holder. Each of the supporting members having at least three fixing elements disposed in an approximately circular arc, and a plurality of linear elastic members are connected to each of the fixing elements.

7 Claims, 10 Drawing Sheets

PRIOR ART

OPTICAL ACTUATOR

This Nonprovisional application claims priority under 35 U.S.C. § 119(a) on Patent Application Ser. No(s). 2003-052554 filed in JAPAN on Feb. 28, 2003, the entire contents of which are hereby incorporated by reference.

BACKGROUND OF THE INVENTION

1. Field of the Invention

The present invention relates to an optical actuator for controlling position of a focusing lens that focuses a laser beam on a disk surface. The optical actuator drives the focusing lens in three directions including focusing, tracking and tilting directions.

2. Description of the Background Art

An Optical actuator drives a focusing lens which forms a beam spot on an information disk, such as a DVD (digital versatile disk) or a CD (compact disk). By driving a focusing lens in a focusing direction, which is orthogonal to the disk surface, and a tracking direction, which is parallel to a radial direction of the disk. The optical actuator controls position of the focusing lens, so that the beam spot is formed on a pit line of the disk accurately. Furthermore, when the disk surface tilts or wobbles with respect to an optical axis of the focusing lens due to disk warpage, the optical actuator performs tilt control by pivotally rotating the focusing lens on an axis along the tangential direction or on an axis-along the radial direction of the disk.

Figure 10:
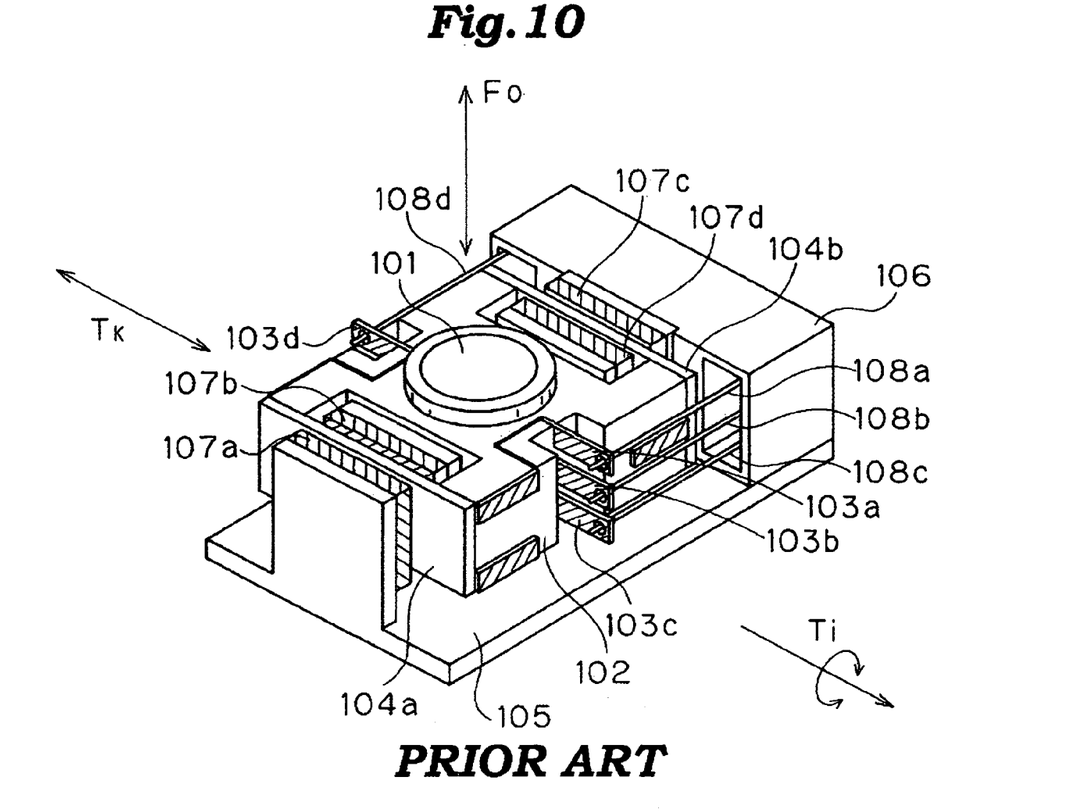
FIG. 10 is a diagrams each illustrating a conventional optical actuator.

FIG. 10 is a diagram illustrating a conventional optical actuator described in Japanese Patent Laid-Open No. 2001-297460. A focusing lens 101 is fixed to a lens holder 102. Six blade springs 103a–103c, and 103d–103f (103e and 103f are not shown) are fixed to each side of the lens holder 102. Print coils 104a and 104b are fixed to another side of the lens holder 102. A suspension holder 106 and permanent magnets 107a–107d are fixed to a base 105. The print coil 104a is disposed between the permanent magnets 107a and 107b, and the print coil 104b is disposed between the permanent magnets 107c and 107d. The blade springs 103a–103c and 103d–103f are connected to the suspension wires 108a–108c and 108d–108f (108e and 108f are not shown), each of which are fixed to the suspension holder 106.

When a current is supplied to focusing coils built in the print coils 104a and 104b so as to generate electro-magnetic forces in a vertical condition, the lens holder 102 is controlled in the focusing direction Fo. When a current is supplied to tracking coils built in the print coils 104a and 104b so as to generate electro-magnetic forces in the radial direction, the lens holder 102 is controlled in a tracking direction Tk. When a current is supplied to the focusing coils so as to generate electro-magnetic forces having opposite direction in each of the print coils 104a and 104b, rotational moment on an axis in the tracking direction Tk occurs to the lens holder 102. As a result, the lens holder 102 is driven in the tilting direction Ti.

When the lens holder 102 moves in the tilting direction, each of the blade springs 103a and 103c is warped or stretched, and the tilt control becomes unstable. Furthermore, the structure using blade springs requires higher cost and many assembly steps.

It is therefore, a primary object of the invention to provide an optical actuator which is able to perform the tilt control stably and can be produced with low cost.

SUMMARY OF THE INVENTION

This object is achieved in accordance with one aspect of the present invention which is an optical actuator includes a focusing lens for focusing a laser beam on a information disk, a lens holder for holding the focusing lens, a focusing coil for driving the focusing lens in an axial direction of the laser beam, a tracking coil for driving the focusing lens in a radial direction of the information disk, a tilting coil for pivotally rotating the focusing lens on an axis along the tangential direction of the disk and a pair of supporting members each disposed on each opposing sides of the lens holder. Each of the supporting members having at least three fixing elements disposed in an approximately circular arc, and a plurality of linear elastic members are connected to each of the fixing elements.

DESCRIPTION OF THE PREFERRED EMBODIMENTS

Figure 1:
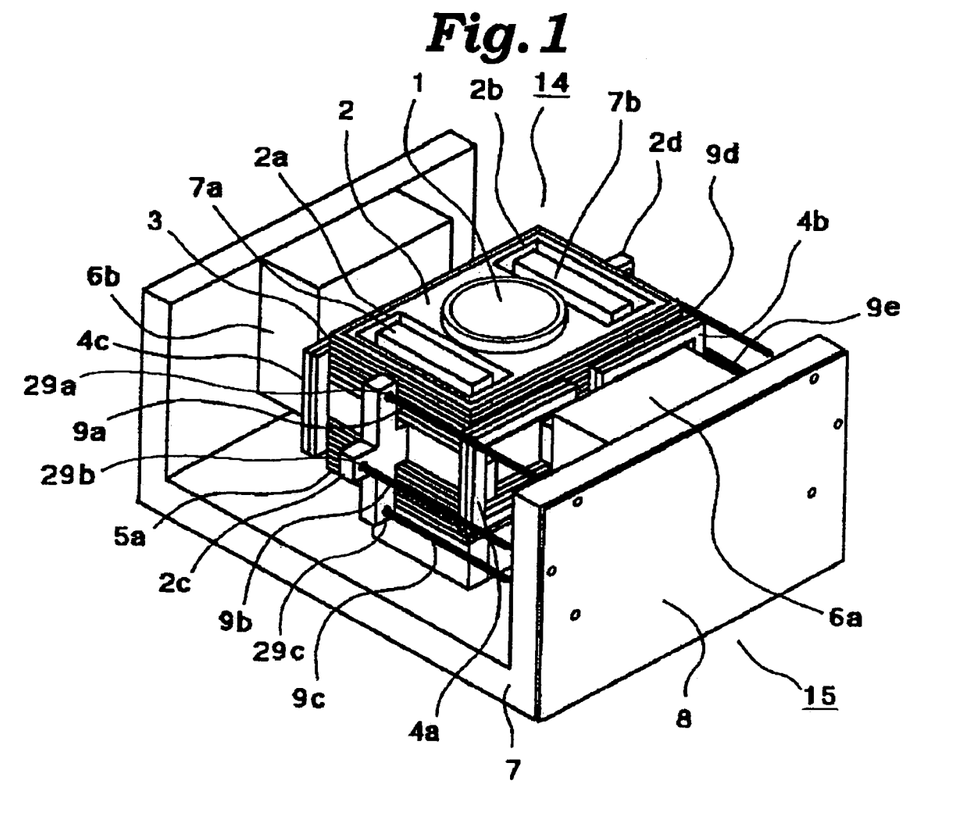
FIGS. 1–3 are diagrams each illustrating an optical actuator according to the present invention.
Figure 2:
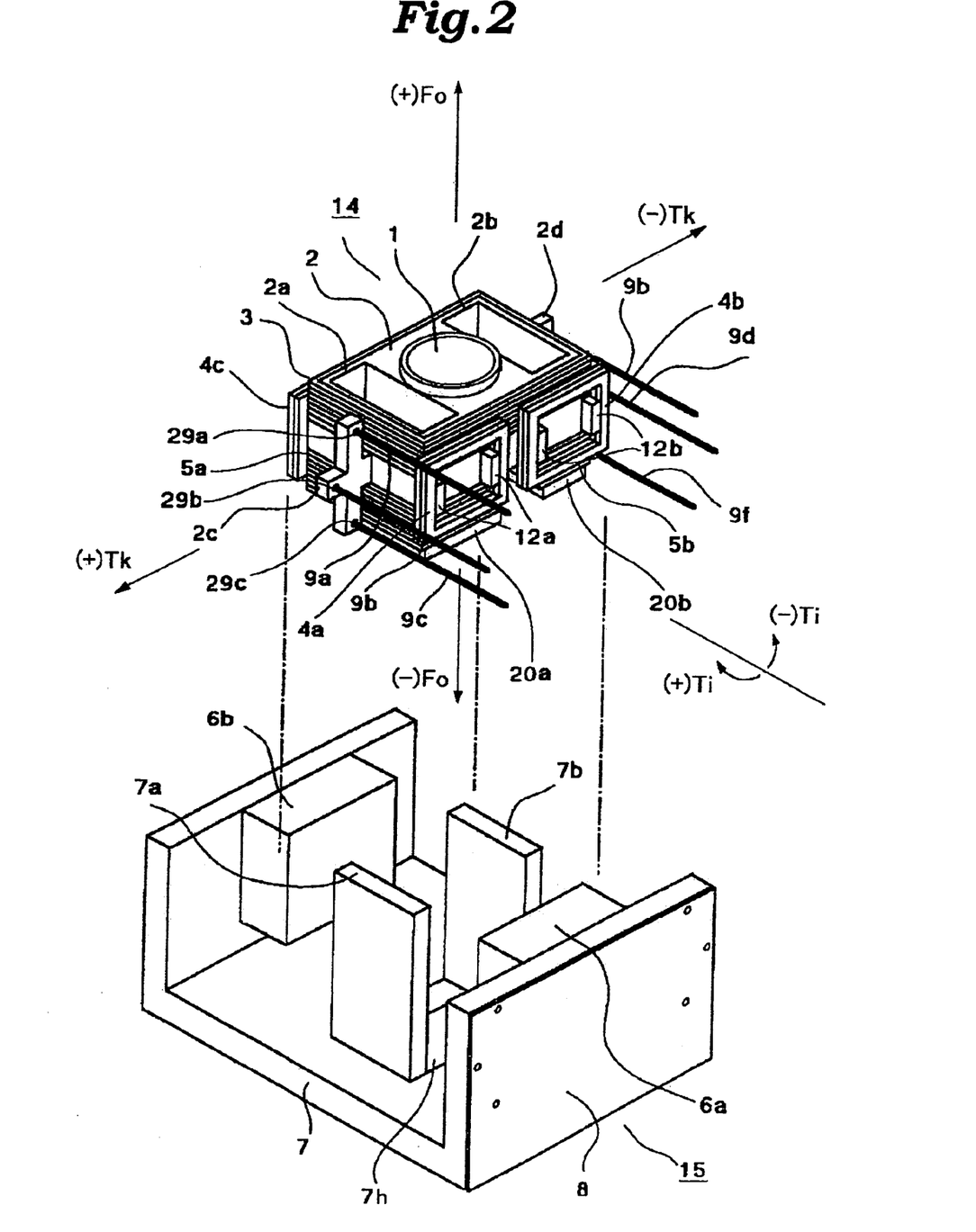
Figure 3A:
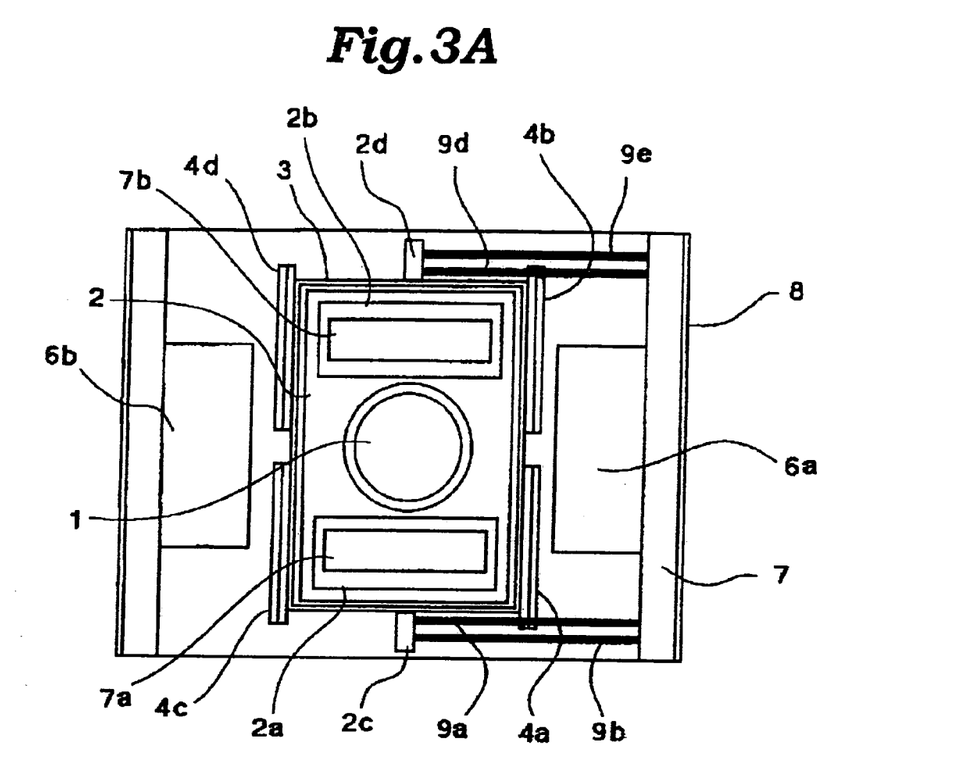
Figure 3B:
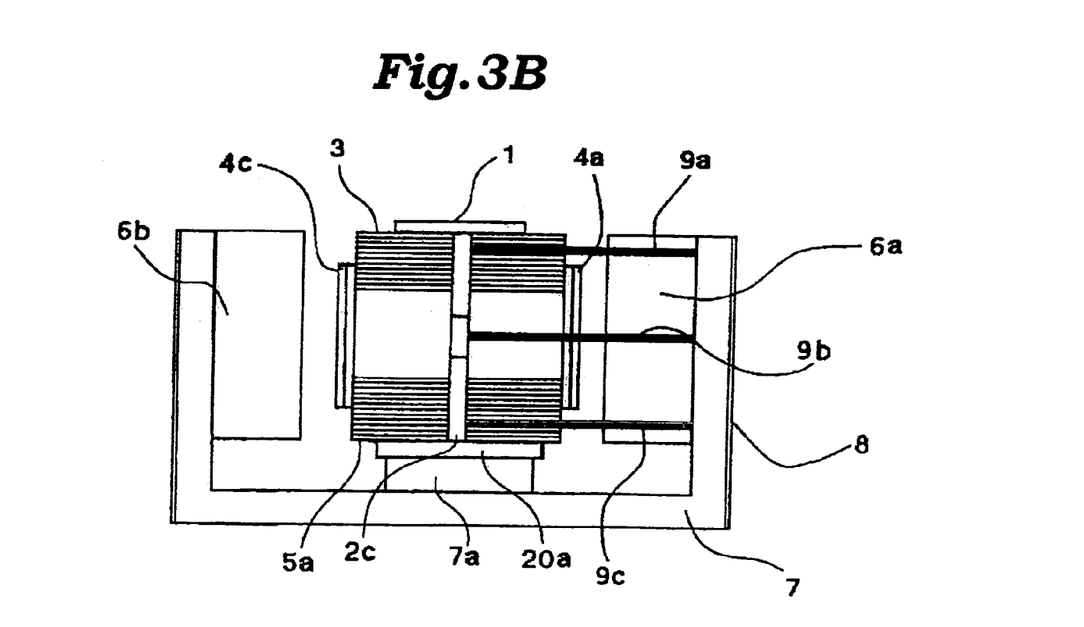

FIG. 1 is a diagram illustrating an optical actuator according to the present invention. FIG. 2 is a diagram illustrating a holding part 15 and a moving part 14 of the optical actuator illustrated in FIG. 1. FIGS. 3A and 3B are diagrams illustrating a top view and a side view of the optical actuator illustrated in FIG. 1. As illustrated in FIG. 2, the holding part 15 comprises a yoke 7, permanent magnets 6a and 6b, and a circuit board 8. The permanent magnets 6a and 6b are attached on the yoke 7 so that their identical poles face each other.

As illustrated in FIG. 2, the yoke 7 has projecting portions 7a and 7b, and a hole 7h for passing a laser beam. The moving part 14 includes a focusing lens 1, a lens holder 2, a focusing-control coil 3, tracking-control coils 4a, 4b, 4c and 4d, and tilting-control coils 5a and 5b. The focusing lens 1 focuses the laser beam passing through the hole 7h onto a information disk. The focusing-control coil 3 is wound around the lens holder 2, and the tilting-control coils 5a and 5b are fixed to a pair of poles 20a and 20b formed on the bottom of the lens holder 2. The focusing-control coil 3, and the tilting-control coils 5a and 5b are arranged so that their respective axes will be parallel to an optical axis of the focusing lens 1. As illustrated in FIG. 2, positioning members 12a and 12b for positioning the tracking-control coils 4a and 4b in appropriate positions are provided on a side of the lens holder 2. The tracking-control coils 4c and 4d are arranged on the opposite side of the lens holder 2 by positioning members 12c and 12d (not shown). The lens holder 2 has holes 2a and 2b where each of the projecting member 7a and 7b passes through.

A pair of supporting members 2c and 2d is fixed on both sides of the lens holder 2. Each of the supporting members 2c and 2d is provided with fixing elements 29a–29c and 29d–29f. The linear elastic members 9a–9c and 9d–9f are fixed to the supporting members 2c and 2d via the fixing elements 29a–29c and 29d–9f. The other ends (not shown) of the linear elastic members 9a–9c, and 9d–9f are connected to the circuit board 8 via fixing elements disposed on the side of the yoke 7. With these linear elastic members 9a–9f, the moving part 14 is supported movably in each of three control directions including the focusing direction Fo, the tracking direction Tk, and the tilting direction Ti. The linear elastic members 9a–9c and 9d–9e also provide electric connection to the respective control coils.

Figure 4:
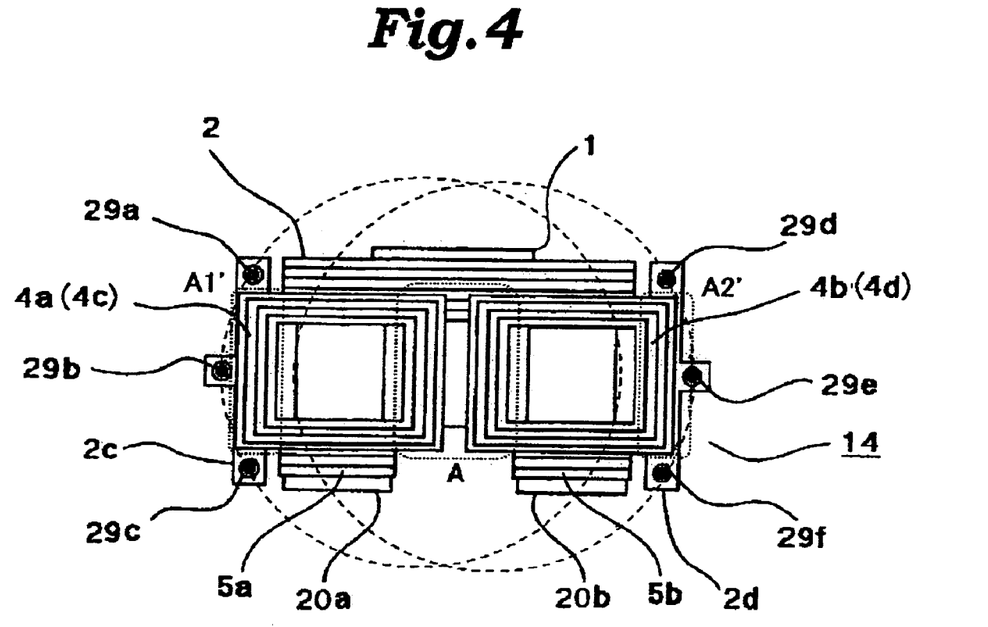
FIG. 4 is a diagram illustrating a moving part of the optical actuator.

FIG. 4 is a diagram illustrating a side fiew of the moving part 14. As illustrated in FIG. 4, the fixing elements 29a–29c, and 29d–29f are arranged in the circular arcs indicated as dotted lines. In other words, the linear elastic members 9a–9c and 9d–9f are arranged on cylindrical surfaces. Each cylindrical surface may have the same center.

Focusing error and tracking error corresponding to displacement of the beam spot in the focusing and tracking directions are detected by a well-known method such as the astigmatic method or DPD (differential phase detection). In this method, currents proportional to the focusing error and the tracking error are supplied to the focusing coil 3 and the tracking coils 4a and 4b, respectively. Then, the respective coils are driven in the focusing direction Fo and the tracking direction Tk, with forces generated by interaction between currents of the coils and the magnetic field formed by the permanent magnets 6a and 6b to perform the focusing control and the tracking control.

With those controls, when the disk surface tilts with respect to an optical axis of the focusing lens 1, an amount of the tilt is detected using a well-known method. Using the detected amount of the tilt, a tilt control signal for adjusting the optical axis of the focusing lens 1 is generated, and a current corresponding to the tilt control signal is supplied to the tilt control coils 5a and 5b. Accordingly, the tilting-control coil 5a is driven in the direction +Fo (or −Fo), and the tilting-control coil 5b is driven in the opposite direction −Fo (or +Fo), thereby rotating the lens holder 2 in the tilting direction Ti illustrated in FIG. 2. Since the linear elastic members 9a–9c and 9d–9f are arranged on the respective cylindrical surfaces, they keep almost same length when they are twisted in the tilting direction Ti. Thus, stress (bending force) that generated in the linear elastic materials 9b and 9e in its longitudinal direction during the tilt control can be decreased. As a result, the lens holder 2 is rotated in the tilting direction Ti stably. Furthermore, since the distortion of the linear elastic members 9a–9f in the tilt control is limited to only bending distortion, each of three controls, the focusing control, the tracking control and the tilt control, can be stably performed.

As shown in FIG. 3B and FIG. 4, the height of the tracking-control coils 4a and 4b (4c and 4d) are narrower than the distance between the linear elastic members 9a and 9c, and 9d and 9f, and outer sides of the tracking-control coils 4a and 4b (4c and 4d) indicated as A1' and A2' in FIG. 4 are disposed outside of the lens holder 2. While the tracking control, an opposite force to the tracking direction occurs inner sides of the tracking control coils 4a–4d indicated as A in FIG. 4. At the same time, a force in the opposite direction occurs in the outer sides (A1' and A2'). In order to perform the tracking control effectively, it is preferable to keep enough distance between the outer side of the tracing control coils 4a–4d (A1' and A2') and the permanent magnets 6a and 6b, so as to reduce the opposite force occurring in the outer side of the tracking coils 4a–4d.

As illustrated in FIG. 4, the linear elastic members 9b and 9e are arranged outward of the other linear elastic members 9a–9c, and 9d–9f, and the height of the tracking-control coils 4a and 4b is narrower than the distance between the linear elastic members 9a and 9c, and 9d and 9f. Thus, the outer sides of the tracking control coils 4a–4d can be disposed outside of the lens holder 2, thereby securing enough distance from the permanent magnets 6a and 6b. This configuration enables to drive the lens holder 2 in the tracking direction effectively.

Figure 5:
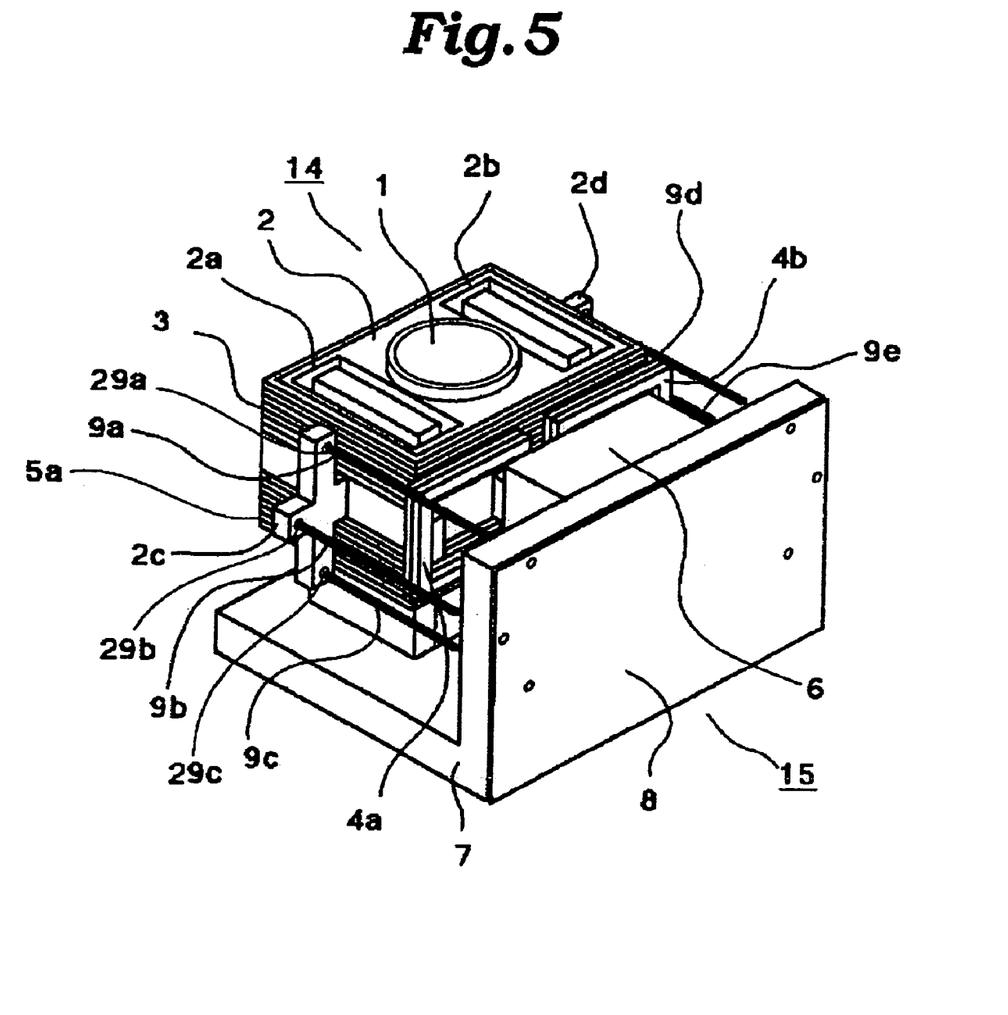
FIGS. 5 and 6 are diagrams each illustrating another example of the optical actuator according to the present invention.
Figure 6A:
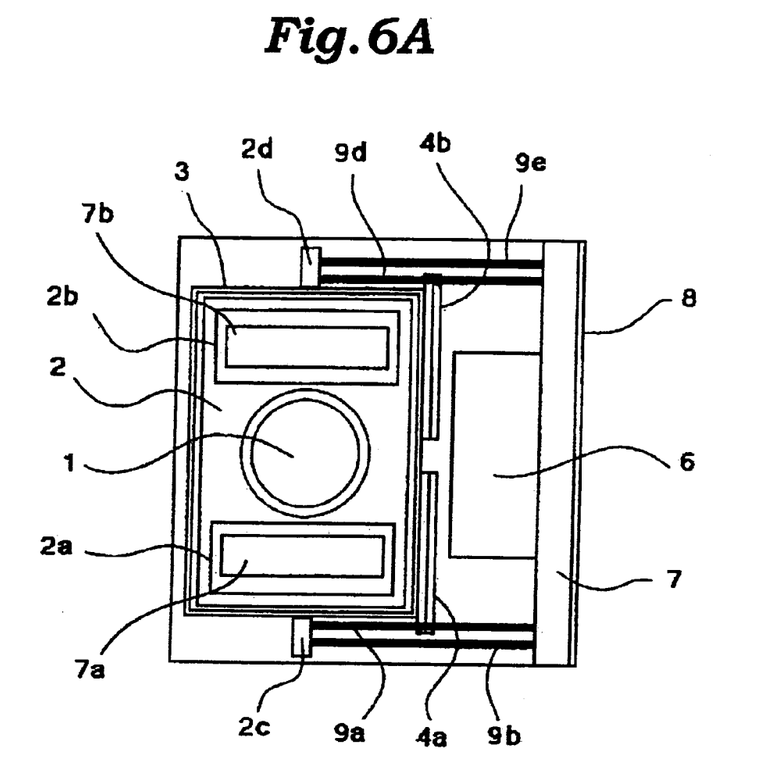
Figure 6B:
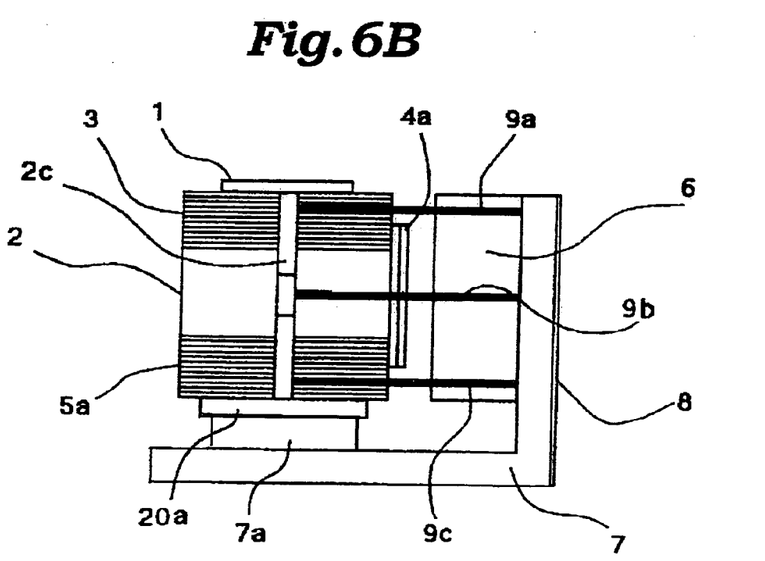

FIG. 5 is a diagram illustrating another example of the optical actuator according to this invention. FIGS. 6A and 6B are diagrams illustrating a top view and a side view of the optical actuator in FIG. 5. The optical actuator illustrated in FIGS. 5, 6A and 6B use single permanent magnet 6 attached on the yoke 7 to form magnetic filed, which is necessary to generate force to drive the lens holder 2.

A structure using single permanent magnet 6 to produce magnetic field can reduce the cost, however, in this structure, each center of the focusing control, the tracking control, and the tilt control deviates from the focusing lens 1. As a result, the control become unstable. This problem can be solved by adjusting the position of the supporting member 2c and 2d. The supporting members 2c and 2d are arranged in the suitable position between each center of the focusing control, the tracking control, and the tilt control and the center of the focusing lens 1. A counterweight may be provided so that the center of gravity of the lens holder 2 locates in suitable position for preventing unnecessary wobble. Using one permanent magnet 6 can decrease the cost.

Figure 7:
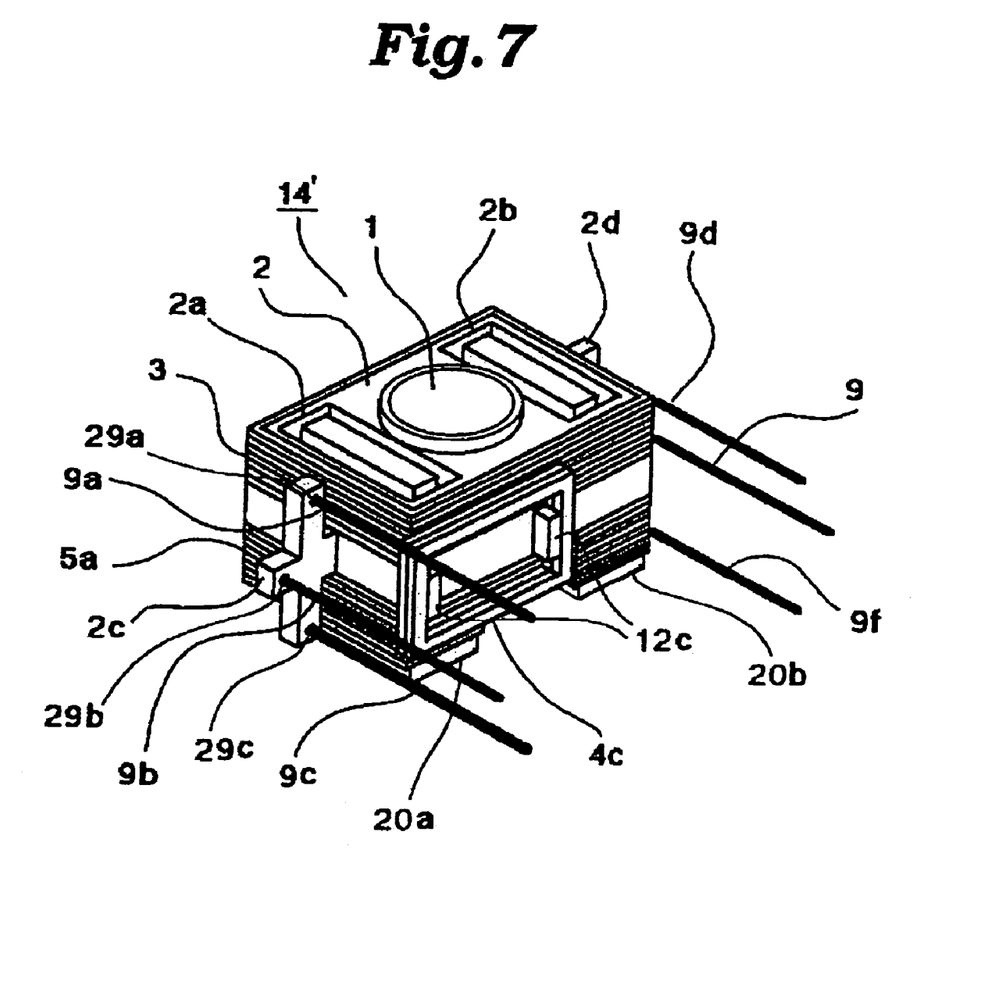
FIG. 7 is a diagram illustrating another example of the optical actuator according to the present invention.

FIG. 7 is a diagram illustrating another example of a moving part 14'. As illustrated in FIG. 7, the moving member 14' has single tracking coil 4c. By using single tracking coil, the cost can be decreased.

Figure 8:
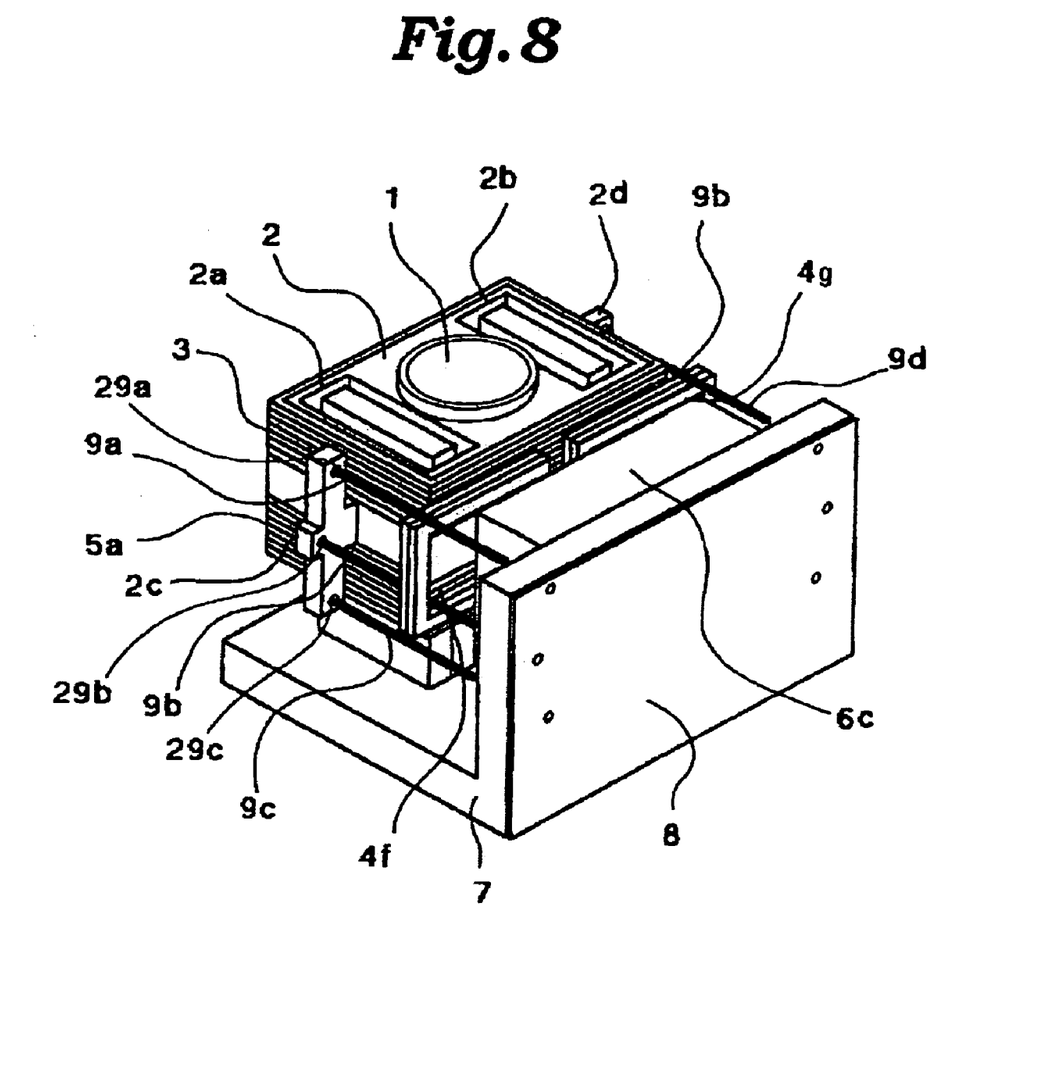
FIG. 8 is a diagram illustrating another example of the optical actuator according to the present invention.
Figure 9:
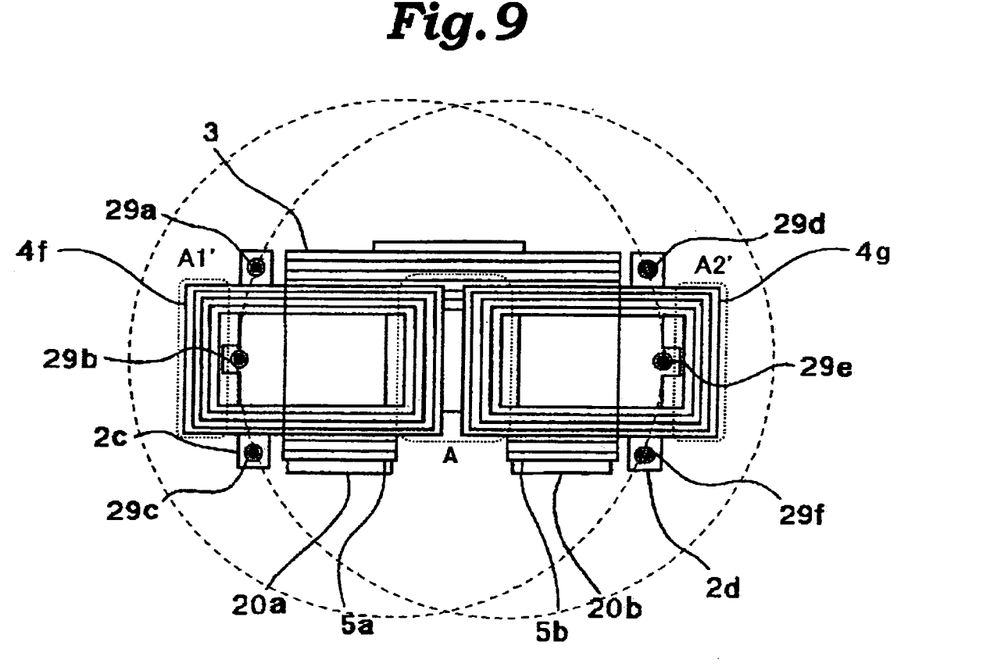
FIG. 9 is a diagram illustrating a moving part of the optical actuator illustrated in FIG. 9.

FIG. 8 is a diagram illustrating another example of the optical actuator according to this invention. The width of a permanent magnet 6c of the optical actuator illustrated in FIG. 8 is made wider than the width of the permanent magnets 6a and 6 of the optical actuator illustrated in FIGS. 1 and 5. FIG. 9 is a diagram illustrating the lens holder 2 of the optical actuator in FIG. 8. As illustrated in FIG. 9, outer sides of the tracking-control coils 4f–4g are disposed outside of the linear elastic members 9b and 9e, in order to keep enough distance from the permanent magnet 6c.

By increasing the width of the permanent magnet 6c, the magnet flux acting each of the focusing coils can be increased, and sufficient force for driving the lens holder 2 can be obtained. Furthermore, by disposing the outer sides of the tracking coils 4f–4g, where the opposite forces to the tracking direction occur, stable tracking control can be performed.

In the optical actuator according to this invention, the linear elastic members 9a–9c, and 9d–9f for supporting the lens holder 2 are disposed on cylindrical surface. Thus, the stress generated in its longitudinal direction of the linear elastic materials 9b and 9e can be decreased. As a result, the tilt control can be performed stably.

Furthermore, by disposing the linear elastic members 9a–9c and 9d–9f on cylindrical surfaces, the outer sides of the tracking coils 4a–4d, where the opposite forces to the tracking direction occur, can be disposed outside of the holder to secure enough distance from the permanent magnets 6a and 6b. This configuration enables to drive the lens holder 2 in the tracking direction effectively.

Also, as illustrated in FIGS. 5 through 8, reduction of the permanent magnets and the tracking coils decreases the cost.

What is claimed is:

1. An optical actuator comprising:
   a focusing lens for focusing a laser beam on a information disk;
   a holder for holding said focusing lens;
   a focusing coil for driving said focusing lens in an axial direction of said laser beam;
   a tracking coil for driving said focusing lens in a radial direction of said information disk;
   a tilting coil for pivotally rotating said focusing lens on an axis along the tangential direction of the disk;
   a pair of supporting members each disposed on each of two opposing sides of said holder, each of said supporting members having at least three fixing elements disposed in an approximately circular arc; and
   a plurality of linear elastic members connected to each of said fixing elements, said elastic members being of substantially similar length.

2. The optical actuator according to claim 1, wherein said linear elastic members connected to each of said fixing elements are disposed on a cylindrical surface.

3. The optical actuator according to claim 1, wherein said tracking coil is fixed on a side of said holder, and an outer side of said tracking coil is disposed outside of said holder.

4. The optical actuator according to claim 1, wherein said tracking coil is fixed on a side of said holder, and an outer side of said tracking coil is disposed outside of said linear elastic members.

5. The optical actuator according to claim 1, wherein a single tracking coil is disposed on a side of said holder facing a permanent magnet.

6. An optical actuator comprising:
   a focusing lens that focuses a laser beam on an information disk;
   a lens holder that holds the focusing lens;
   a single permanent magnet;
   a focusing coil that drives the focusing lens in an axial direction with respect to the laser beam;
   at least one tracking coil that drives the focusing lens in a radial direction with respect to the information disk, said at least one tracking coil positioned between the lens holder and the single permanent magnet;
   a tilting coil that drives the focusing lens on an axis along a tangential direction with respect to the information disk;
   a pair of support members each disposed on each of two opposing sides of said lens holder, each of the supporting members having at least three elements disposed in an approximately circular arc; and
   a plurality of linear elastic members connected to each of said fixing elements, said elastic members being of substantially similar length.

7. An optical actuator comprising:
   a focusing lens that focuses a laser beam on an information disk;
   a lens holder that holds the focusing lens;
   at least two single permanent magnets positioned on opposites of the lens holder;
   a focusing coil that drives the focusing lens in an axial direction with respect to the laser beam;
   at least one tracking coil that drives the focusing lens in a radial direction with respect to the information disk;
   a tilting coil that drives the focusing lens on an axis along a tangential direction with respect to the information disk;
   a pair of support members each disposed on each of two opposing sides of said lens holder, each of the supporting members having at least three elements disposed in an approximately circular arc; and
   a plurality of linear elastic members connected to each of said fixing elements, said elastic members being of substantially similar length.

\* \* \* \* \*